J. E. BLACKMORE.
VALVE AND RETAINER THEREFOR.
APPLICATION FILED SEPT. 20, 1916.

1,288,486.

Patented Dec. 24, 1918.

Inventor
JOHN E. BLACKMORE.

Witness

By

Attorney

UNITED STATES PATENT OFFICE.

JOHN E. BLACKMORE, OF DETROIT, MICHIGAN.

VALVE AND RETAINER THEREFOR.

1,288,486.  Specification of Letters Patent.  Patented Dec. 24, 1918.

Application filed September 20, 1916. Serial No. 121,318.

*To all whom it may concern:*

Be it known that I, JOHN E. BLACKMORE, a citizen of the United States, residing at Detroit, county of Wayne, State of Michigan, have invented a certain new and useful Improvement in Valves and Retainers Therefor, and declare the following to be a full, clear, and exact description of the same, such as will enable others skilled in the art to which it pertains to make and use the same, reference being had to the accompanying drawings, which form a part of this specification.

This invention relates to valves and retainers therefor, and its object is a taper seated valve provided with a stem and a spring retainer of substantially flat sheet metal removably engaging the stem and coöperating with the spring to maintain the valve on its seat.

Heretofore it has been commonly the practice to provide a stem in threaded relation with the valve body about which the spring engages, the stem being apertured near the end, a washer provided to hold the spring under compression, and a cotter pin passing through the aperture in the stem for retaining the washer. Such arrangement, while possibly inexpensive to manufacture, requires an appreciable time in assembling and is further inconvenient in cleaning the various parts by reason of the waste or other material used in cleaning, catching on the cotter pin, which is also liable to catch in the clothing or cut the hands of the user. A further object of this invention is a retainer for the spring that is extremely simple and inexpensive to manufacture, being formed of stamped sheet metal cupped to provide a seat for the spring and adapted to be very quickly assembled in position or disassembled and having no projecting parts or sharp edges to catch the clothing or cut the hands of the user. Another object of the invention is a stamped sheet metal spring retainer for valves, etc., having a headed stem, the retainer being apertured to engage over the head and provided with a seat for the head, the arrangement being such that the washer may be passed over the head and turned to seat against the head by action of the spring.

These and other objects and the several novel features of the invention in its preferred form are hereinafter more fully described and claimed and shown in the accompanying drawings in which—

Similar characters refer to similar parts throughout the drawing and specification.

Figure 5:
Fig. 5 is a detail in perspective showing the headed stem at the small end of the valve.
Figure 4:
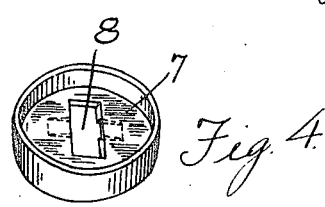
Fig. 4 is a perspective view of the interior of the retainer.

The valve 1 is of the usual type having a tapered body with a transverse channel and fitting in a correspondingly tapered seat in the case 2. This case may be of any shape as required for various purposes and having a channel with which the channel of the valve is adapted to register. The valve is preferably provided at the lower end with an integral stem 3 having a terminal portion 4 less in diameter than the portion 3 and provided at the extreme end with a head 5 of a length equal to the diameter of the portions 3 and of a width not materially greater than the part 4, as will be understood from Fig. 5. A spring 6 is provided engaging about the stem 3 and the portion 4 thereof and a cupped washer of sheet metal is provided adapted to be removably secured beneath the head 5 and compress the spring 6, the two parts coöperating to maintain the valve in its seat.

The washer or retainer is cupped or flanged as shown to receive the end of the coiled spring forming a seat therefor and preventing lateral displacement thereof.

Figure 3:
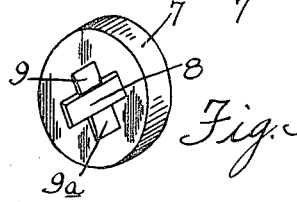
Fig. 3 is a perspective view of the exterior of the retainer.

The washer is also provided with a central aperture 8 of a form to allow the head 5 to pass therethrough in placing the retainer on the stem. The width of the aperture is slightly in excess of the diameter of the portion 4 of the valve stem to allow the washer to be turned about the said portion 4, and the washer is further provided on the outer face, as shown in Fig. 3, with the depressions 9 and 9ª on opposite sides of the aperture and at a right angle thereto, as will be understood from the drawing. These depressions or recesses are preferably formed by stamping the material of the washer and preferably, but not necessarily the depth of the recess is the greatest at the line of the aperture 8, decreasing in depth as the distance increases from the aperture, and the distance from the outer end of the depression 9 to that of the depression 9$^a$ is substantially equal to the length of the aperture and, consequently, of the head 5. It is to be noted that the ends of the head 5 on the inner faces are tapered or beveled to correspond with the bevel of the recess 9 and 9$^a$ in which said ends seat when the retainer is assembled thereon. The depressions or recesses 9 and 9$^a$ on each side of the aperture are formed by depressing the metal below the face of the washer and toward the cupped or flanged side, and the depth of the recesses is sufficient to allow the head of the valve stem to lie practically flush with the outer face of the washer.

Figure 1:
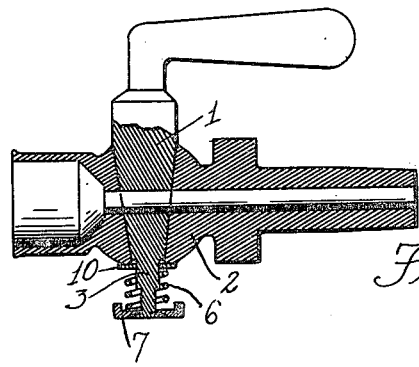
Figure 1 is a longitudinal section of a valve retainer embodying my invention.
Figure 2:
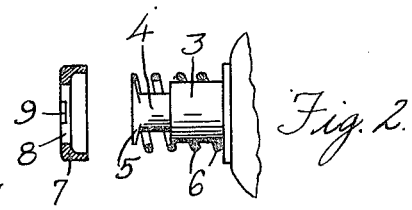
Fig. 2 is an enlarged detail showing the projecting end of the valve stem, the spring and spring retainer being shown in section with the retainer removed from engagement with the stem.

To assemble the parts, the spring is placed about the stem of the valve, as shown in Figs. 1 and 2, and the washer or retainer 7 is then placed over the head 5, which passes through the aperture 8 of the washer. This placing of the washer on the stem places the spring 6 under compression and the retainer is then turned about the portion 4 until the depressions or seats 9 and 9$^a$ are directly beneath the projecting ends of the head 5 whereupon the pressure is released and the washer allowed to seat against the head with the ends engaging in the recesses as will readily be understood from Fig. 1.

With the parts in the assembled relationship stated, the spring holds the washer against the head and rotation of the washer is prevented by reason of the engagement of the head in the depressions 9 and 9$^a$. The spring thus serves the purposes of yieldably holding the retainer in place and by reason of its being under compression as stated, draws the tapered valve snugly onto its seat.

It is to be noted in Fig. 1 particularly that the portion 3 is less in diameter than the small end of the valve and the tapered portion of the valve is somewhat less in length than the seat, thus providing for considerable wear of the valve and seat, by reason of the possible movement of the valve longitudinally prior to projecting from the casing or engaging the washer 10 preferably interposed between the spring and the valve case.

To disassemble the parts the retainer is pushed inward on the valve stem to release the head from the recesses or seats 9 and 9$^a$ whereupon the washer 7 may be turned about the stem until the aperture 8 is in parallelism with the head 5 whereupon the pressure may be released and the washer removed from the stem. It is to be noted that the assembling of this washer or retainer and spring or disassembling thereof with the valve stem is very simple indeed requiring but a slight turn by the fingers of the operator to secure the washer in place or remove it, the action requiring much less time than the assembling of the usual flat washer and cotter pin. It is furthermore to be noted that the assembled device is very neat in appearance and as the head 5 seats in the recess provided, the end of the stem is practically flush with the outer surface of the retainer forming a device that is pleasing in appearance and there is no liability of catching the clothing or hands of the user or the waste used in the cleaning thereof.

Preferably the stem 3 and 4 is formed integrally with the valve member, the parts being turned up at the time of the forming of the valve and is thus inexpensive to manufacture and serviceable in use and while I have shown a valve and body arrangement adapted for use as a priming cup for gasolene engines and the like, it is to be understood that the valve and case may be of various forms as required for different purposes.

Having thus briefly described my invention, its utility, and mode of operation, what I claim and desire to secure by Letters Patent of the United States is—

1. A retainer for coiled compression springs consisting of a substantially flat washer of sheet metal, flanged at the periphery on one side to provide a seat for the spring and prevent lateral displacement and having a central aperture of a length greater than its width and a recess on each longitudinal side of the aperture formed by depressing the metal below the face of the body toward the flanged side.

2. The combination with a valve stem having a terminal head of a width equal to the diameter of the stem and of a length greater than the said diameter, of a substantially flat sheet metal washer having a central aperture through which the head may pass and recesses formed at opposite longitudinal sides of the aperture by depressing the metal below the face of the washer, the said recesses forming seats for the said head and being of such a depth that the end of the head is practically flush with the outer face of the washer, and a spring placed under compression by the washer when seated.

3. The combination with a valve stem provided with a terminal head of a width substantially equal to the diameter of the stem and of a length greater than the said diameter, the projecting ends of the head having oppositely inclined inner faces providing a head of greatest thickness at the junction with the stem, of a sheet metal washer having a central aperture through which the head may pass and recesses formed at opposite sides of the aperture, the recesses being of greatest depth at the aperture and tapering toward the face of the washer forming seats for the tapered ends of the head, and a spring placed under compression by the washer when seated on the head.

4. The combination with a valve stem provided with a terminal head of a width substantially equal to the diameter of the stem and of a length greater than the said diameter, the projecting ends of the head having oppositely inclined inner faces providing a head of greatest thickness at the junction with the stem, of a sheet metal washer having a peripheral flange on one side and a central aperture through which the head may pass and having recesses or depressions formed on opposite sides of the aperture of greatest depth at the aperture and tapering toward the face of the washer providing seats for the tapered ends of the head, and a spring seating in the flanged side of the washer and placed under compression by the washer when seated on the head.

5. A retainer for stems of tapered valves and coiled compression springs thereon, consisting of a stamped sheet metal washer formed with an upturned peripheral edge forming a flange on one side and having a central rectangular aperture, and depressions formed transversely thereof at opposite longitudinal sides of the aperture, and in the side opposite the flange, the depressions being of greatest depth at the aperture and tapering toward the face of the washer.

In testimony whereof, I sign this specification.

JOHN E. BLACKMORE.